(12) United States Patent
Huang et al.

(10) Patent No.: US 8,570,664 B2
(45) Date of Patent: Oct. 29, 2013

(54) ZOOM LENS SYSTEM

(75) Inventors: Hai-Jo Huang, New Taipei (TW);
Fang-Ying Peng, New Taipei (TW);
Sheng-An Wang, New Taipei (TW);
An-Tze Lee, New Taipei (TW); Xiao-Na Liu, Guangdong (CN)

(73) Assignees: Hong Fu Jin Precision Industry (ShenZhen) Co., Ltd., Shenzhen (CN);
Hong Hai Precision Industry Co., Ltd., New Taipei (TW)

( * ) Notice: Subject to any disclaimer, the term of this patent is extended or adjusted under 35 U.S.C. 154(b) by 85 days.

(21) Appl. No.: 13/340,695

(22) Filed: Dec. 30, 2011

(65) Prior Publication Data
US 2013/0135752 A1 May 30, 2013

(30) Foreign Application Priority Data
Nov. 25, 2011 (CN) .......................... 2011 1 0380320

(51) Int. Cl.
*G02B 15/14* (2006.01)
(52) U.S. Cl.
USPC ........................................................ 359/689

(58) Field of Classification Search
USPC ......................................................... 359/689
See application file for complete search history.

(56) References Cited

U.S. PATENT DOCUMENTS

| 8,000,023 B2 | 8/2011 | Chou et al. | |
| 2010/0328500 A1* | 12/2010 | Yoshitsugu et al. | 348/240.3 |

* cited by examiner

*Primary Examiner* — William Choi
(74) *Attorney, Agent, or Firm* — Altis & Wispro Law Group, Inc.

(57) ABSTRACT

A zoom lens system includes a first lens group of negative refractive power, a second lens group of positive refractive power and a third lens group of positive refractive power. The zoom lens system satisfies the following condition formulas: $0.78<|f2/f1|<0.91$, and $0.72<L2/fT<0.87$, where f1 represents an effective focal length of the first lens group, f2 represents an effective focal length of the second lens group, L2 is a displacement of the second lens group when the zoom lens system varies from a wide-angle state to a telephoto state, and fT represents an effective focal length of the zoom lens system which is in the telephoto state.

8 Claims, 18 Drawing Sheets

ZOOM LENS SYSTEM

BACKGROUND

1. Technical Field

The present disclosure relates to lenses and, particularly, to a zoom lens system which has a high zoom ratio, a reduced total length, and a high resolution.

2. Description of Related Art

To obtain small camera modules which provide a high quality image over a large object distance range, a zoom lens system having a high zoom ratio, a short total length, and a high resolution is desired.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

FIGS. 12-18 are graphs showing the transverse aberration, spherical aberration, and field curvature, and distortion occurring in the zoom lens system of FIG. 8 in a telephoto state.

DETAILED DESCRIPTION

Embodiments of the present disclosure will be described in detail with reference to the drawings.

Figure 1:
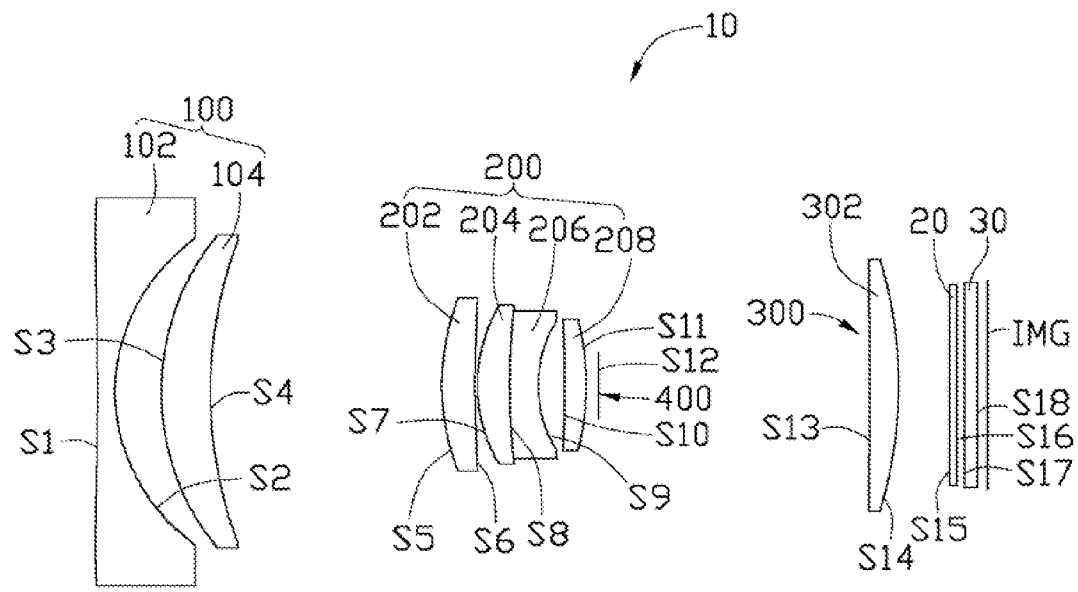
FIG. 1 is a schematic view of a zoom lens system, according to an embodiment.

Referring to FIG. 1, a zoom lens system 10, according to an embodiment, includes, in an order from its object-side to its image-side, a first lens group 100 of negative refractive power, a second lens group 200 of positive refractive power, and a third lens group 300 of positive refractive power. The zoom lens system 10 satisfies the following condition formulas: $0.78<|f2/f1|<0.91$ and $0.72<L2/fT<0.87$, where f1 represents the effective focal length of the first lens group 100, f2 represents the effective focal length of the second lens group 200, L2 is the displacement of the second lens group 200 when the zoom lens system 10 is changed from a wide-angle state to a telephoto state, and fT represents the effective focal length of the zoom lens system 10 which is in a telephoto state.

By satisfying the above-listed condition formulas, the effective focal length of the zoom lens system 10 can be varied over a large range by changing a distance between the first lens group 100 and the second lens group 200, so obtaining a relatively high zoom ratio. In contrast, if the above-listed condition formulas are not satisfied, the advantages of a high zoom ratio, a short total overall length, or/and the high resolution of the zoom lens system 10 cannot be achieved.

For example, if the condition formula: $0.78<|f2/f1|<0.91$ is not satisfied, then (1) the spherical aberration and color aberration occurring in the zoom lens system 10 in both the wide-angle and the telephoto states cannot be effectively controlled if the effective focal length of the second lens group 200 is too short, thus degrading the resolution of the zoom lens system 10; and (2) the distortion occurring in the zoom lens system 10 in the wide-angle state cannot be effectively controlled if the effective focal length of the first lens group 100 is too short, thus again degrading the resolution of the zoom lens system 10, and (3) the total length of the zoom lens system 10 in the wide-angle state cannot be effectively controlled if the effective focal length of the first lens group 100 is too long, thus increasing the total overall length of the zoom lens system 10.

If the condition formula: $0.72<L2/fT<0.87$ is not satisfied, then the total overall length of the zoom lens system 10 cannot be controlled if the displacement is too large, or the spherical aberration and color aberration occurring in the zoom lens system 10 in the wide-angle state cannot be controlled if the displacement is too small.

When capturing images, light rays enter the zoom lens system 10, passing through the first lens group 100, the second lens group 200, and the third lens group 300 in sequence, and then pass through a filter 20 and a cover glass 30, and finally form images on an image plane IMG. During the capture, the distance between the first lens group 100 and the second lens group 200 can be adjusted to obtain a suitable effective focal length of the zoom lens system 10. After the effective focal length of the zoom lens system 10 has been fixed, the third lens group 300 can be moved along the optical axis of the zoom lens system 10 to focus the zoom lens system 10.

The first lens group 100 includes, in the order from the object-side to the image-side of the zoom lens system 10, a first lens 102 of negative refractive power and a second lens 104 of positive refractive power. The second lens group 200 includes, in the order from the object-side to the image-side of the zoom lens system 10, a third lens 202 of positive refractive power, a fourth lens 204 of positive refractive power, a fifth lens 206 of negative refractive power, and a sixth lens 208 of negative refractive power. The fourth lens 204 and the fifth lens 206 are combined. The third lens group 300 includes a seventh lens 302 of positive power.

The zoom lens system 10 further satisfies the following condition formula: $1.75<V1/V2<2.45$, where V1 and V2 are the Abbe numbers of the first and second lenses 102 and 104 in light at the wavelength of 587.6 nm (d light) respectively. In this way, any color aberration occurring in the zoom lens system 10 can be further restricted.

The zoom lens system 10 also satisfies the condition formula: $0.27<f2/f3<0.5$, where f3 represents the effective focal length of the third lens group 300. In this way, a focusing sensitivity of the third lens group 300 can be suitably adjusted.

The third lens 202 includes at least one aspherical surface. As such, any spherical aberration and color aberration occurring in the zoom lens system 10 in both the wide-angle and telephoto states can be restricted. The sixth lens 208 is a plastic lens to reduce the costs of the zoom lens system 10.

The zoom lens system 10 includes an aperture stop 400 interposed between the second lens group 200 and the third lens group 300. The zoom lens system 10 includes, in the order from the object-side to the image-side, surfaces S1-S14. The filter 20 includes, in the order from the object-side to the image-side, surfaces S15-S16. The cover glass 30 includes, in the order from the object-side to the image-side, surfaces S17-S18.

The zoom lens system 10 satisfies Table 1, where the following symbols are used:

F: the effective focal length of the zoom lens system 10;
FNo: the focal ratio (F number);
2ω: the field angle;
R: the curvature radius of each surface;
D: the distance between each two adjacent surfaces along the optical axis of the zoom lens system 10;
Nd: the refractive index of each lens or the filter 20 or the cover glass 30 in d light; and
Vd: the Abbe number of each lens or the filter 20 or the cover glass 30 in d light.

TABLE 1

| Surface | R (mm) | D (mm) | ND | VD |
|---|---|---|---|---|
| S1 | −243.0664 | 0.7 | 1.821 | 42.71 |
| S2 | 6.986198 | 1.635 | — | — |
| S3 | 9.795 | 1.949 | 1.946 | 17.98 |
| S4 | 17.098 | D4 | — | — |
| S5 | 9.080511 | 1.315 | 1.801 | 45.45 |
| S6 | 45.79786 | 0.1 | — | — |
| S7 | 6.204 | 1.286 | 1.741 | 52.6 |
| S8 | 30.492 | 1.132 | 1.847 | 23.62 |
| S9 | 4.838 | 1.073 | — | — |
| S10 | −66.5612 | 0.841 | 1.531 | 55.75 |
| S11 | −10.9801 | 0.5 | — | — |
| S12 | Infinity | D12 | — | — |
| S13 | −700.586 | 1.152 | 1.785 | 25.72 |
| S14 | −17.294 | D14 | — | — |
| S15 | Infinity | 0.3 | 1.52 | 64.2 |
| S16 | Infinity | 0.3 | — | — |
| S17 | Infinity | 0.5 | 1.52 | 64.2 |
| S18 | Infinity | 0.4 | — | — |
| IMG | Infinity | — | — | — |

The aspherical surface is shaped according to the formula:

$$x = \frac{ch^2}{1+\sqrt{1-(k+1)c^2h^2}} + \sum A_i h^i,$$

where h is the height from the optical axis of the zoom lens system 10 to a point of the aspherical surface, c is the vertex curvature, k is a conic constant, and Ai is the i-th order correction coefficient of the aspherical surface.

The zoom lens system 10 also satisfies Tables 2-4:

TABLE 2

| | S1 | S2 | S5 |
|---|---|---|---|
| K | 499.686 | 0.06879327 | 0.5368633 |
| A4 | −9.8703956e-005 | −0.00022425152 | −0.00034048197 |
| A6 | 3.8201302e-006 | −3.9956898e-006 | 2.0874412e-006 |
| A8 | −2.6961178e-008 | 3.4276174e-007 | 3.8276242e-008 |
| A10 | −1.7656108e-010 | −1.5552525e-008 | −5.9444241e-008 |
| A12 | 4.385518e-012 | 2.1253295e-010 | −2.8580116e-010 |
| A14 | −5.0093241e-014 | 1.5377698e-012 | 5.5525497e-010 |
| A16 | 4.4099635e-016 | −7.7311868e-014 | −2.9974179e-011 |

TABLE 3

| | S6 | S10 | S11 |
|---|---|---|---|
| K | 126.4003 | −1318.043 | −2.423973 |
| A4 | −0.00039669862 | −0.0014985306 | −0.00036451564 |

TABLE 3-continued

| | S6 | S10 | S11 |
|---|---|---|---|
| A6 | 4.7406796e-006 | 0.00013064897 | −4.5827646e-006 |
| A8 | −4.2054543e-007 | −9.8508789e-006 | −4.5230724e-006 |
| A10 | −4.7513838e-008 | 2.2182242e-008 | 2.6670809e-006 |
| A22 | 8.2636708e-010 | 2.05636e-007 | 1.2611351e-009 |
| A14 | 2.5839402e-010 | 2.6891843e-008 | −2.629116e-008 |
| A16 | −2.4846792e-011 | −5.1058739e-009 | 1.0645869e-009 |

TABLE 4

| F | FNo | 2ω | D4 (mm) | D12 (mm) | D14 (mm) |
|---|---|---|---|---|---|
| 5.046 | 3.45 | 80 | 21.87 | 6.192 | 2.015 |
| 17.81 | 5.15 | 24.67 | 2.763 | 17.899 | 2.55 |
| 28.76 | 6.15 | 15.43 | 0.404 | 28.389 | 1.01 |

The values of relevant parameters and the condition formulas are listed in Table 5:

TABLE 5

| parameter/condition formula | value |
|---|---|
| f1 | −13.92 |
| f2 | 11.17 |
| f3 | 22.58 |
| fT | 28.76 |
| L2 | 21.19 |
| V1 | 42.706 |
| V2 | 17.984. |
| |f2/f1| | 0.802 |
| L2/fT | 0.737 |
| V1/V2 | 2.374 |
| f2/f3 | 0.495 |

Figure 2:
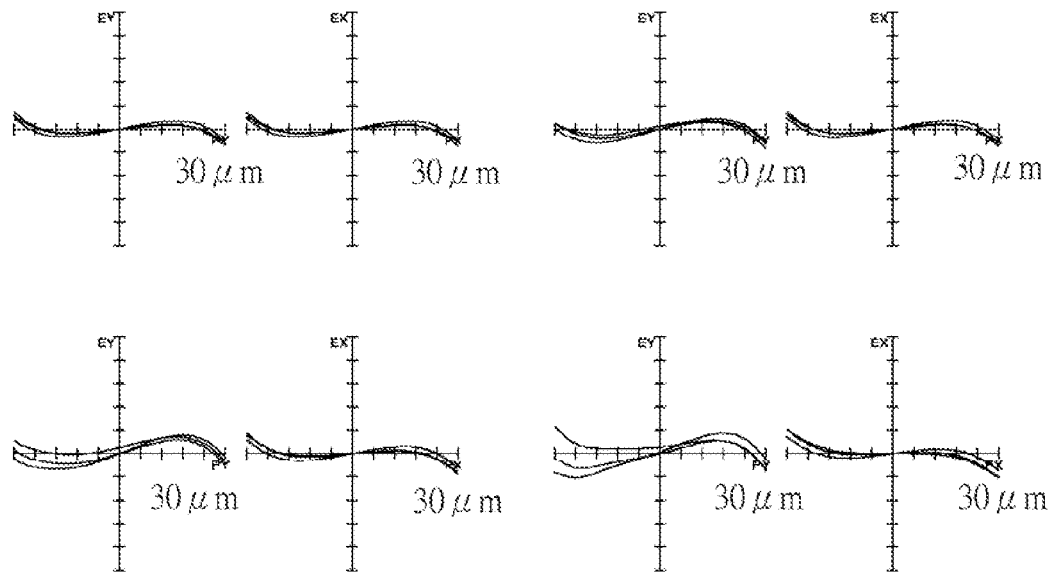
FIGS. 2-5 are graphs showing the transverse aberration, spherical aberration, field curvature, and distortion occurring in the zoom lens system of FIG. 1 in a wide-angle state.
Figure 3:
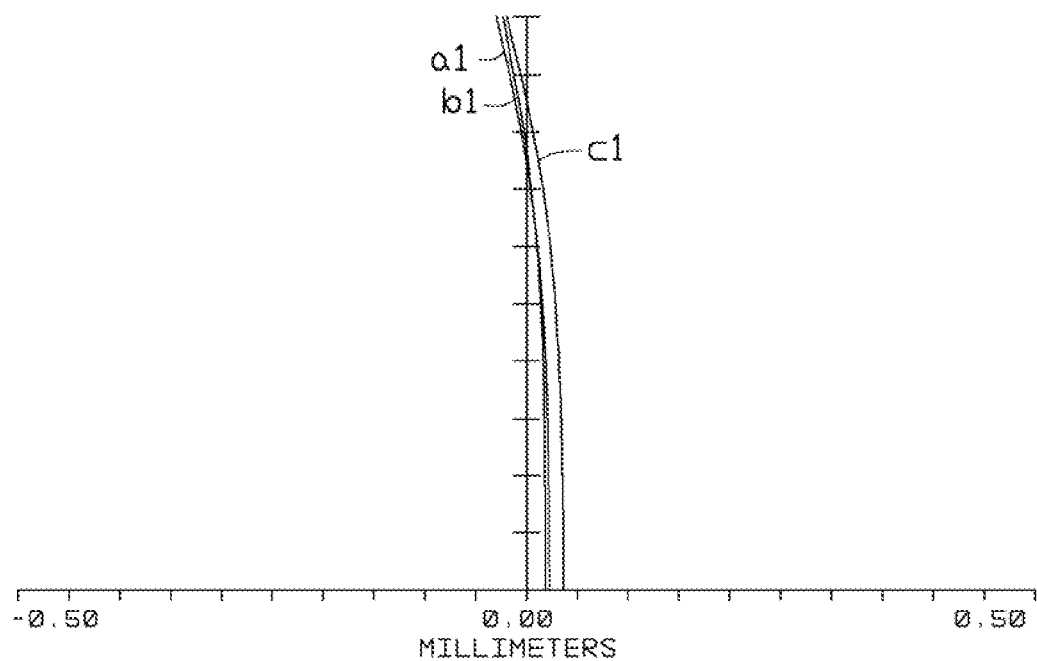
Figure 4:
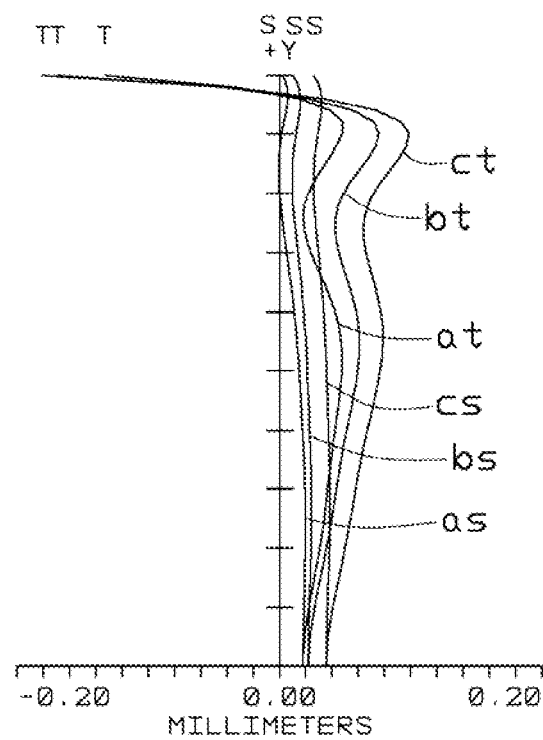
Figure 5:
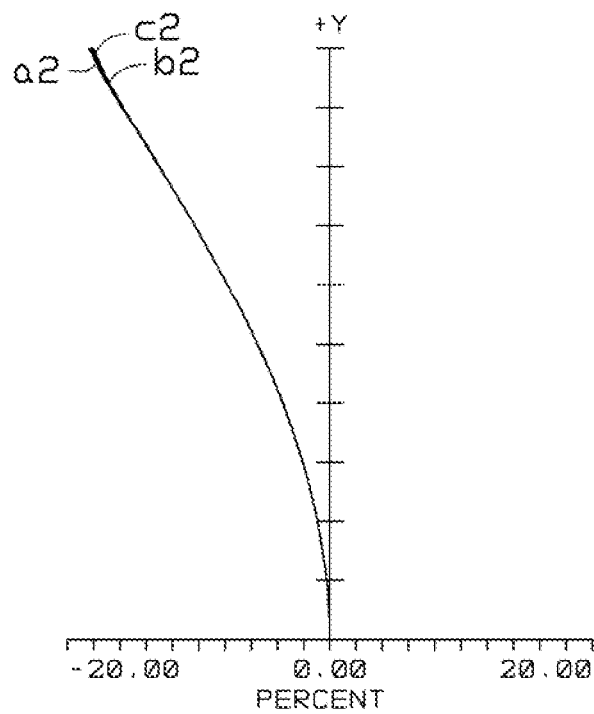
Figure 6:
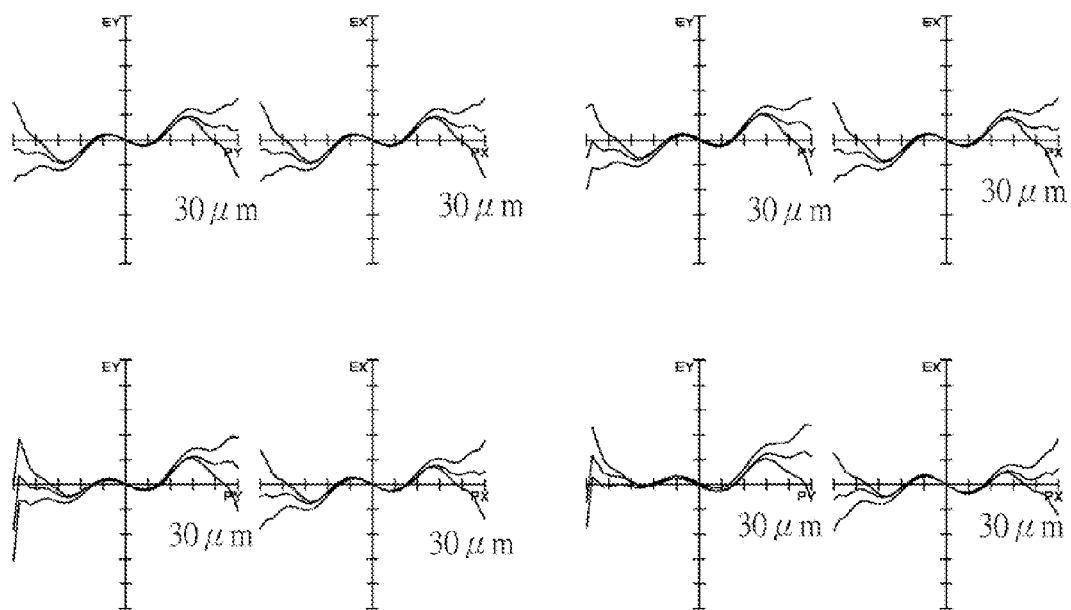
FIGS. 6-9 are graphs showing the transverse aberration, spherical aberration, and field curvature, and distortion occurring in the zoom lens system of FIG. 1, in a telephoto state.
Figure 7:
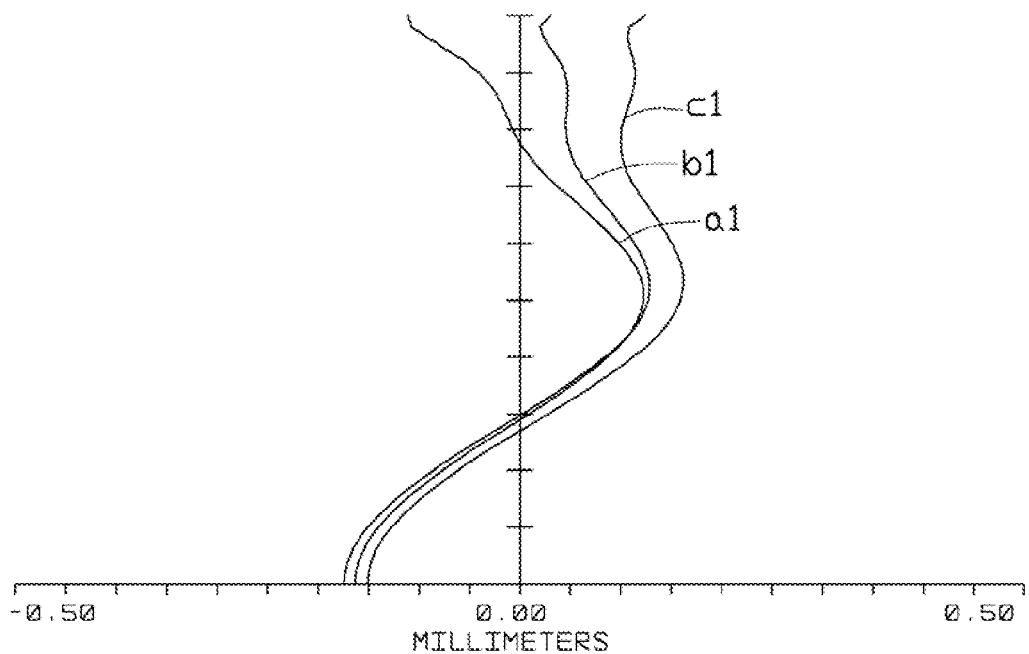
Figure 8:
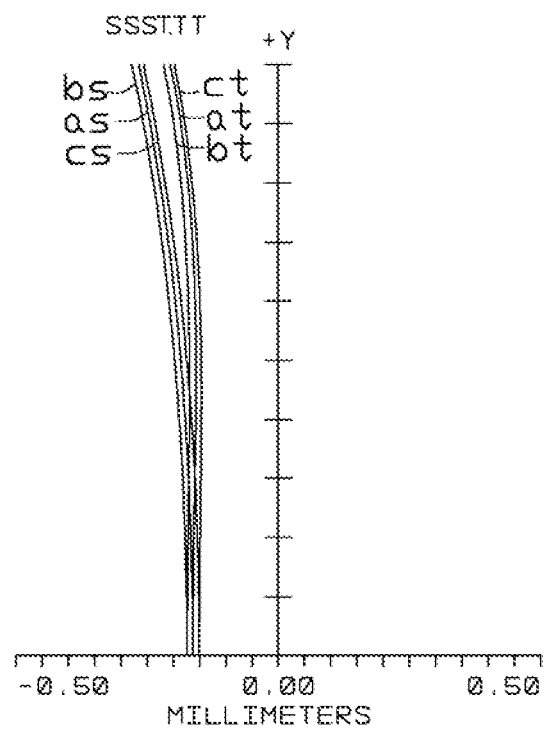
Figure 9:
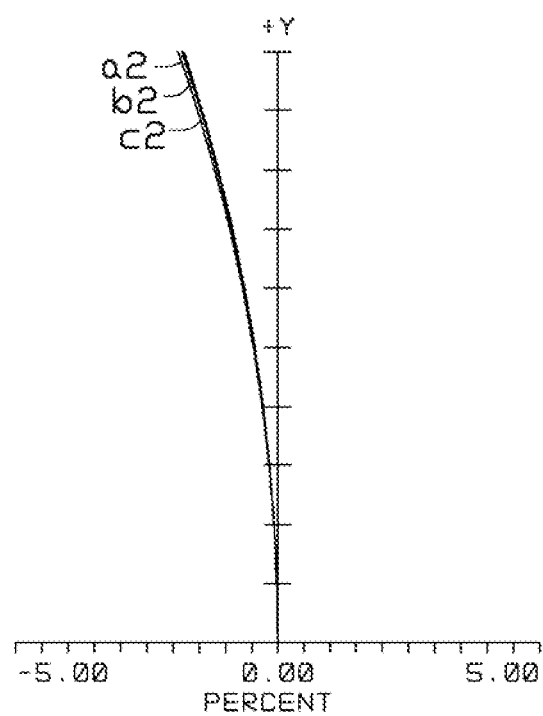

In FIGS. 2 and 6, the graphs, from top left to bottom right, show the transverse aberration characteristics of ¼ field, ½ field, ¾ field, and the whole field, and, in each graph, the curves correspond to lights of the wavelengths 486 nm, 588 nm, and 656 nm. In FIGS. 3-5 and 7-9, the curves a1, b1, and c1 show the spherical aberration characteristics of lights of the wavelengths 486 nm, 588 nm, and 656 nm in the zoom lens system 10. The curves at, as, bt, bs, ct, and cs show the meridional and sagittal field curvatures of lights of the wavelengths 486 nm, 588 nm, and 656 nm in the zoom lens system 10. The curves a2, b2, and c2 depict the distortion characteristics of lights of the wavelengths 486 nm, 588 nm, and 656 nm in the zoom lens system 10. As shown in FIGS. 2-9, various aberrations occurring in the zoom lens system 10 are controlled, increasing the resolution of the zoom lens system 10.

Figure 10:
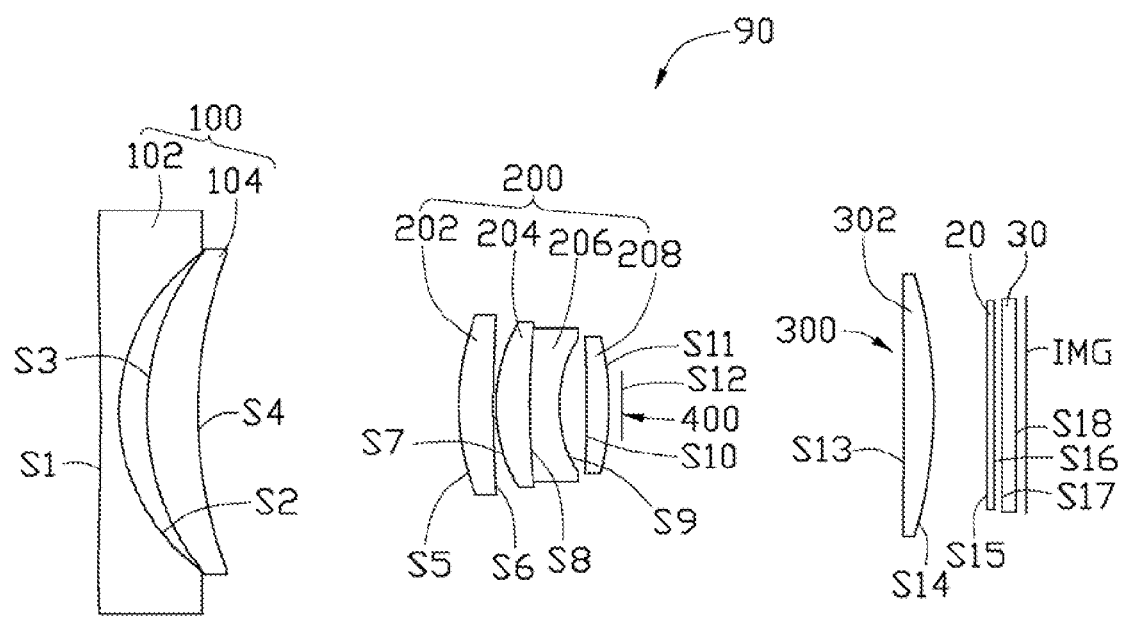
FIG. 10 is a schematic view of a zoom lens system, according to another embodiment.
Figure 11:
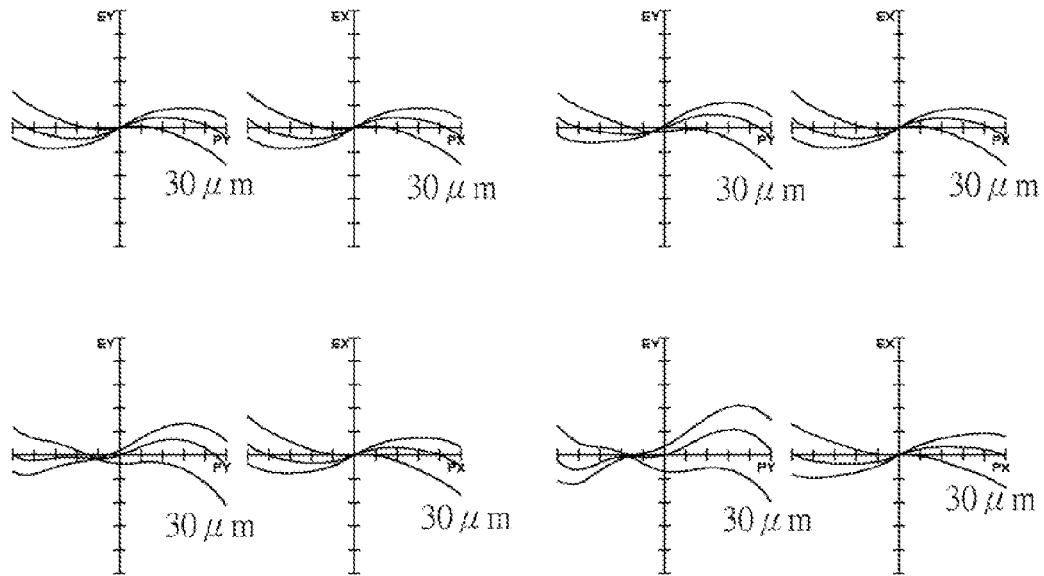
FIGS. 11-14 are graphs showing the transverse aberration, spherical aberration, field curvature, and distortion occurring in the zoom lens system of FIG. 8 in a wide-angle state.
Figure 12:
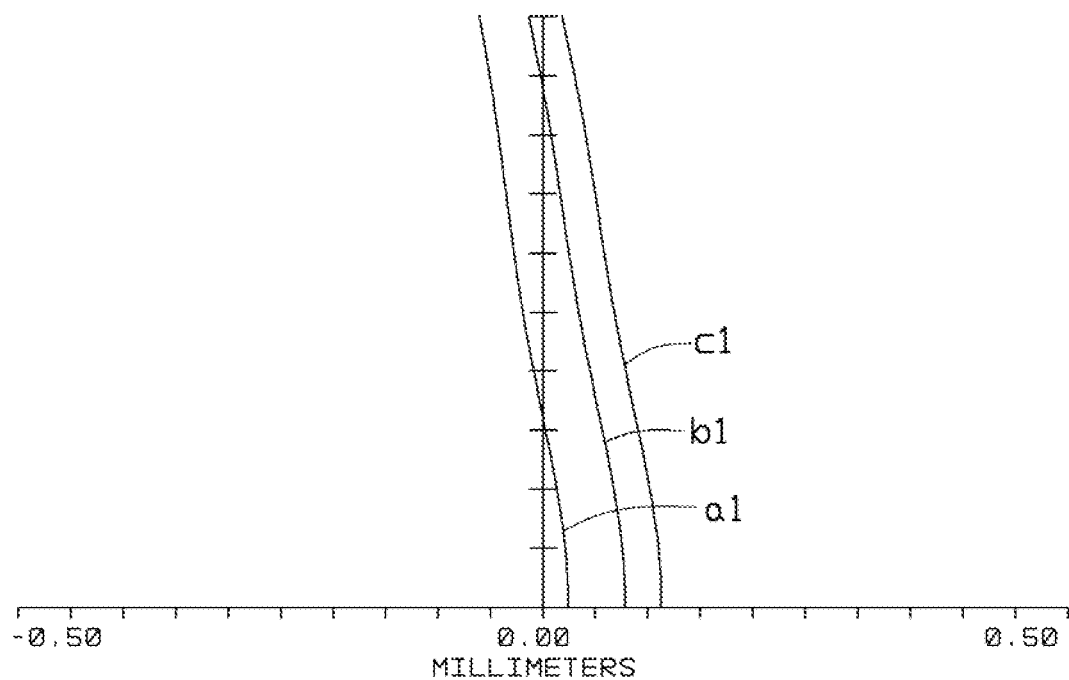
Figure 13:
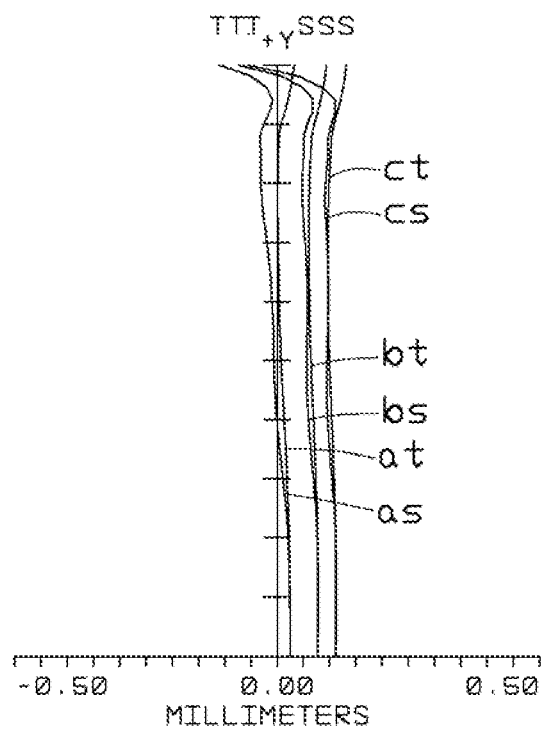
Figure 14:
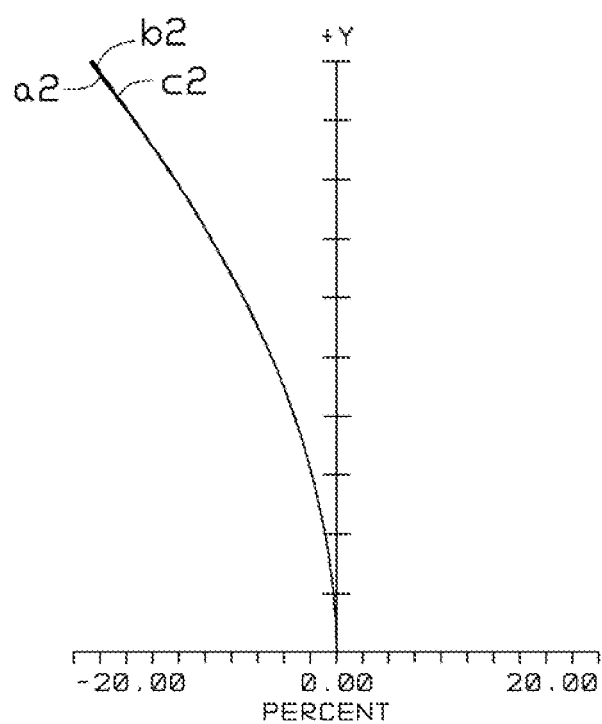
Figure 15:
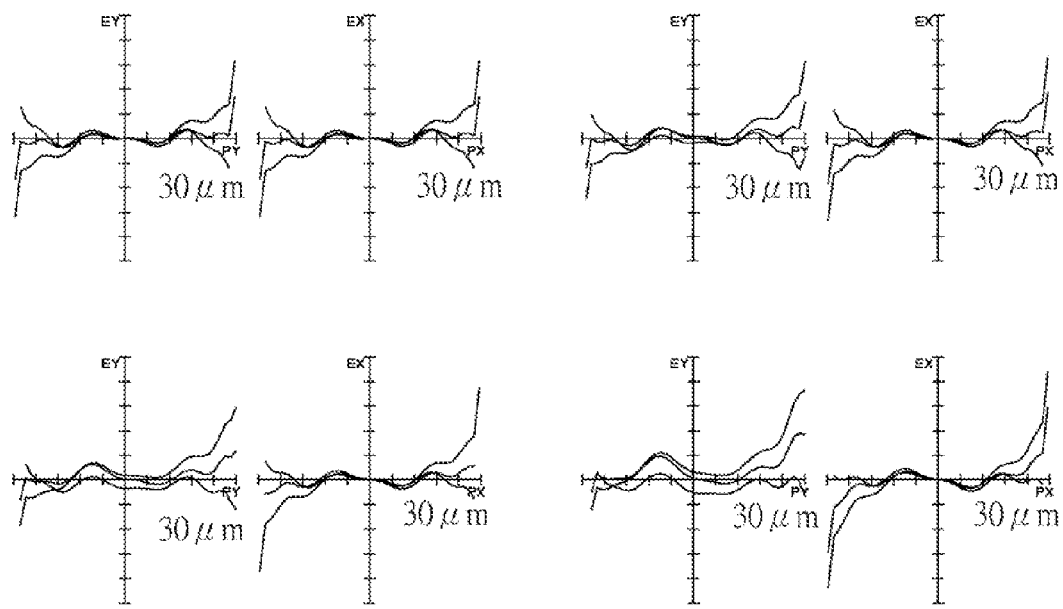
Figure 16:
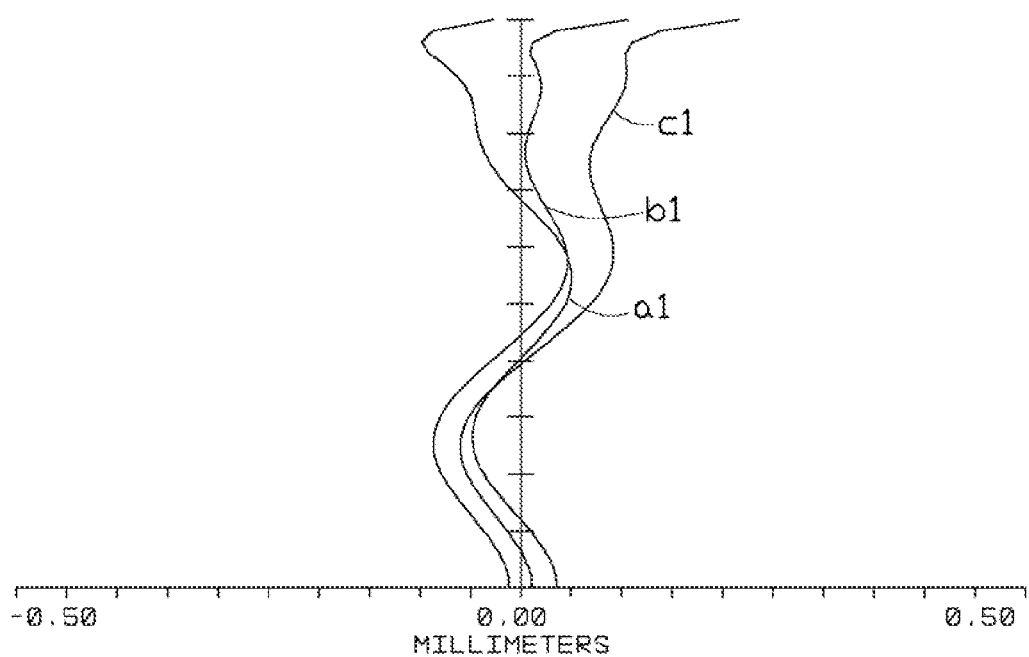
Figure 17:
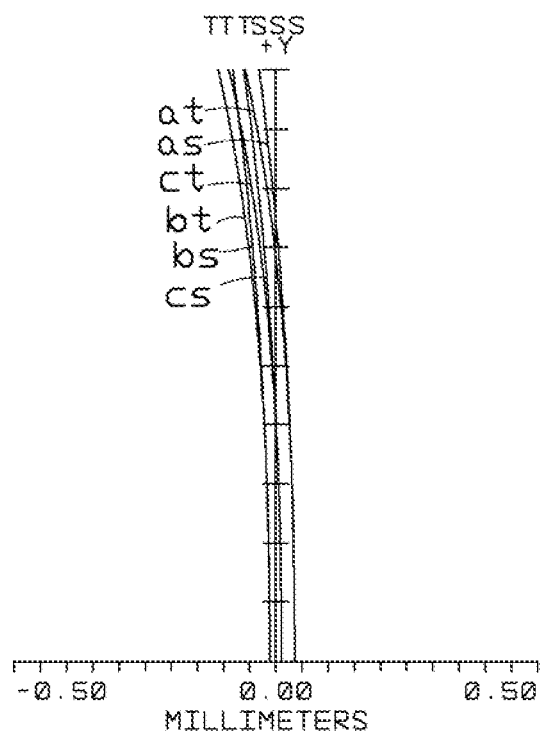
Figure 18:
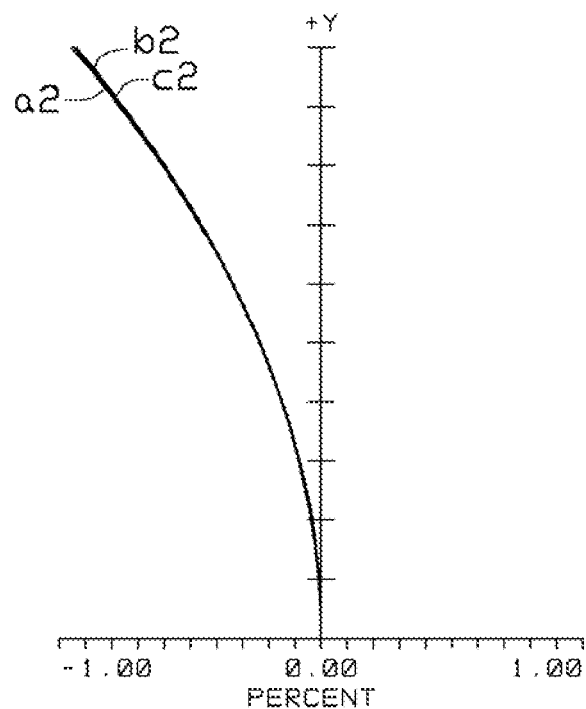

Referring to FIG. 10, a zoom lens system 90, according to another embodiment, is substantially similar to the zoom lens system 10 but satisfies Tables 6-10 in this way.

TABLE 6

| Surface | R (mm) | D (mm) | ND | VD |
|---|---|---|---|---|
| S1 | −125.0187 | 0.7 | 1.821 | 42.71 |
| S2 | 6.560378 | 1.756 | – | – |
| S3 | 9.652 | 2.396 | 1.847 | 23.78 |
| S4 | 19.269 | D4 | – | – |
| S5 | 9.281855 | 1.295 | 1.801 | 45.45 |
| S6 | 46.52185 | 0.1 | – | – |
| S7 | 6.521 | 1.164 | 1.741 | 52.6 |
| S8 | 14.319 | 1.09 | 1.847 | 23.78 |
| S9 | 4.934 | 1.015 | – | – |

TABLE 6-continued

| Surface | R (mm) | D (mm) | ND | VD |
|---|---|---|---|---|
| S10 | −86.41501 | 0.893 | 1.531 | 55.75 |
| S11 | −10.28002 | 0.5 | − | − |
| S12 | Infinity | D12 | − | − |
| S13 | −67.317 | 0.95 | 1.773 | 49.57 |
| S14 | −21.019 | D14 | − | − |
| S15 | Infinity | 0.3 | 1.52 | 64.2 |
| S16 | Infinity | 0.3 | − | − |
| S17 | Infinity | 0.5 | 1.52 | 64.2 |
| S18 | Infinity | 0.4 | − | − |
| IMG | Infinity | − | − | − |

TABLE 7

| | S1 | S2 | S5 |
|---|---|---|---|
| k | −372.8928 | 0.02221197 | 0.3854655 |
| A4 | −1.4945826e-005 | −0.00015791223 | −0.0003820942 |
| A6 | 2.9255894e-006 | −5.2545975e-006 | 5.0598402e-007 |
| A8 | −4.2898424e-008 | 3.7082278e-007 | 1.8219305e-007 |
| A10 | −2.8073063e-010 | −1.7539774e-008 | −5.9434353e-008 |
| A12 | 6.5706444e-012 | 1.3271629e-010 | −5.8087949e-010 |
| A14 | 4.6730833e-015 | 1.6684308e-012 | 6.9393231e-010 |
| A16 | 1.1921464e-016 | −6.6473219e-014 | −3.504407e-011 |

TABLE 8

| | S6 | S10 | S11 |
|---|---|---|---|
| k | 129.9844 | −5673.337 | −1.642425 |
| A4 | −0.00046802677 | −0.0016357099 | −0.00053388651 |
| A6 | 1.1075687e-005 | 0.0001708832 | 1.7964967e-005 |
| A8 | −5.5376959e-007 | −3.2200392e-006 | −5.8194269e-006 |
| A10 | −4.9126047e-008 | 1.2349572e-007 | 2.6425244e-006 |
| A12 | 3.0430274e-009 | 1.4236873e-007 | 4.9296363e-008 |
| A14 | 3.5814826e-010 | 1.9537233e-008 | −2.215772e-008 |
| A16 | −3.3612306e-011 | −3.0743549e-009 | 6.8878413e-010 |

TABLE 9

| F | FNo | 2ω | D4 (mm) | D12 (mm) | D14 (mm) |
|---|---|---|---|---|---|
| 5.033 | 3.45 | 80 | 21.38 | 6.051 | 3.077 |
| 17.82 | 5.15 | 24.67 | 3.223 | 18.94 | 2.921 |
| 28.78 | 6.15 | 15.43 | 0.3 | 29.224 | 4.6 |

TABLE 10

| parameter/condition formula | value |
|---|---|
| f1 | −12.61 |
| f2 | 11.31 |
| f3 | 39.18 |
| fT | 28.78 |
| L2 | 24.696 |
| V1 | 42.706 |
| V2 | 23.784. |
| \|f2/f1\| | 0.897 |
| L2/fT | 0.858 |

TABLE 10-continued

| parameter/condition formula | value |
|---|---|
| V1/V2 | 1.796 |
| f2/f3 | 0.288 |

As shown in FIGS. 11-18, any aberrations occurring in the zoom lens system 90 are also controlled.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A zoom lens system, in order from an object-side to an image-side thereof, comprising:
    a first lens group of negative refractive power, the first lens group comprising, in the order from the object-side to the image-side of the zoom lens system, a first lens of negative refractive power and a second lens of positive refractive power;
    a second lens group of positive refractive power, the second lens group comprising, in the order from the object-side to the image-side of the zoom lens system, a third lens of positive refractive power, a fourth lens of positive refractive power, a fifth lens of negative refractive power, and a sixth lens of negative refractive power; and
    a third lens group of positive refractive power;
    the zoom lens system satisfying the following condition formulas:

$0.78<|f2/f1|<0.91$, and $0.72<L2/fT<0.87$, where f1 represents an effective focal length of the first lens group, f2 represents an effective focal length of the second lens group, L2 is a displacement of the second lens group when the zoom lens system varies from a wide-angle state to a telephoto state, and fT represents an effective focal length of the zoom lens system which is in the telephoto state.

2. The zoom lens system of claim 1, wherein the zoom lens system satisfies the following condition formula: $1.75<V1/V2<2.45$, where V1, V2 are Abbe numbers of the first lens and the second lens in d light, respectively.

3. The zoom lens system of claim 1, wherein the third lens comprises at least one aspherical surface.

4. The zoom lens system of claim 1, wherein the sixth lens is a plastic lens.

5. The zoom lens system of claim 1, wherein the fourth lens and the fifth lens are combined together.

6. The zoom lens system of claim 1, wherein the third lens group comprises a seventh lens of positive refractive power.

7. The zoom lens system of claim 1, wherein the zoom lens system satisfies the following condition formula: $0.28<f2/f3<0.5$, where f3 represents an effective focal length of the third lens group.

8. The zoom lens system of claim 1, further comprising an aperture stop positioned between the second lens group and the third lens group.

* * * * *